(12) United States Patent
Oba

(10) Patent No.: US 10,864,775 B2
(45) Date of Patent: Dec. 15, 2020

(54) TIRE

(71) Applicant: Sumitomo Rubber Industries, Ltd., Hyogo (JP)

(72) Inventor: Ryo Oba, Kobe (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 308 days.

(21) Appl. No.: 15/964,826

(22) Filed: Apr. 27, 2018

(65) Prior Publication Data

US 2018/0319219 A1 Nov. 8, 2018

(30) Foreign Application Priority Data

May 2, 2017 (JP) .................. 2017-091905

(51) Int. Cl.
*B60C 11/03* (2006.01)
*B60C 11/12* (2006.01)

(52) U.S. Cl.
CPC ...... *B60C 11/0304* (2013.01); *B60C 11/0302* (2013.01); *B60C 11/0306* (2013.01);
(Continued)

(58) Field of Classification Search
CPC ............. B60C 11/0304; B60C 11/0302; B60C 2011/1204; B60C 2011/1236;
(Continued)

(56) References Cited

U.S. PATENT DOCUMENTS

2009/0095391 A1 4/2009 Kojima
2013/0167994 A1* 7/2013 Hada .................. B60C 11/1369
152/209.8

(Continued)

FOREIGN PATENT DOCUMENTS

EP 2752309 A2 7/2014
EP 2899041 A1 7/2015
(Continued)

OTHER PUBLICATIONS

Extended European Search Report issued by the European Patent Office dated Jul. 16, 2018, which corresponds to EP18170137.6-1012 and is related to U.S. Appl. No. 15/964,826.

*Primary Examiner* — Jacob T Minskey
*Assistant Examiner* — Virak Nguon
(74) *Attorney, Agent, or Firm* — Studebaker & Brackett PC

(57) ABSTRACT

A tire tread is provided with a crown main groove, and outboard and inboard shoulder main grooves to divide the tread portion into an outboard crown land portion, an inboard crown land portion, an outboard shoulder land portion and an inboard shoulder land portion. The inboard shoulder land portion is provided with inboard shoulder lateral grooves connecting an inboard tread edge and the inboard shoulder main groove. The outboard shoulder land portion is provided with outboard shoulder lateral grooves extending axially inwardly from an outboard tread edge and terminating within the outboard shoulder land portion. The inboard crown land portion is provided with inboard crown lateral grooves extending from the inboard shoulder main groove and terminating within the inboard crown land portion. The outboard crown land portion is provided with outboard crown lateral grooves extending from the crown main groove and terminating within the outboard crown land portion.

20 Claims, 11 Drawing Sheets

(52) U.S. Cl.
CPC ...... *B60C 11/0332* (2013.01); *B60C 11/1204* (2013.01); *B60C 11/1236* (2013.01); *B60C 11/1263* (2013.01); *B60C 11/1281* (2013.01); *B60C 2011/039* (2013.01); *B60C 2011/0334* (2013.01); *B60C 2011/0344* (2013.01); *B60C 2011/0353* (2013.01); *B60C 2011/0358* (2013.01); *B60C 2011/0365* (2013.01); *B60C 2011/0372* (2013.01); *B60C 2011/1209* (2013.01)

(58) Field of Classification Search
CPC ..... B60C 2011/0344; B60C 2011/0358; B60C 2011/0376
See application file for complete search history.

(56) References Cited

U.S. PATENT DOCUMENTS

2015/0075686 A1* 3/2015 Suga ............... B60C 11/033
152/209.16
2016/0144665 A1* 5/2016 Koishikawa ........ B60C 11/0327
152/209.1
2016/0303919 A1* 10/2016 Yamaoka ............ B60C 11/1307
2017/0113493 A1* 4/2017 Osawa ................ B60C 11/0304
2017/0320360 A1* 11/2017 Yamakawa ......... B60C 11/1236
2018/0015787 A1* 1/2018 Hayashi .................. B60C 11/13

FOREIGN PATENT DOCUMENTS

| | | |
|---|---|---|
| EP | 3025875 A1 | 6/2016 |
| EP | 3056359 A1 | 8/2016 |
| EP | 3260308 A1 | 12/2017 |
| JP | S63-159108 A | 7/1988 |
| JP | 2013035449 A * | 2/2013 |
| JP | 2015-051751 A | 3/2015 |
| JP | 2015-171841 A | 10/2015 |
| JP | 2016-150601 A | 8/2016 |

* cited by examiner

TIRE

BACKGROUND ART

Field of the Invention

The present disclosure relates to tires, and more particularly to a tire capable of improving snow performance while maintaining steering stability on dry roads.

Description of the Related Art

Tires which includes treads having a predetermined orientation for mounting on a vehicle and divided into two shoulder land portions and two crown land portions, i.e. so-called four-rib tires, have been proposed (e.g. JP2016-150601A1). Each tread rib of such tires as mentioned above tends to have a large width and high rigidity. Thus, the four-rib tires may be expected to exert an excellent steering stability on dry roads.

Even in the four-rib tires, sufficient snow performance when driving on snow roads are required. Generally, in order to improve snow performance of tires, lateral grooves may be provided on the tread land portions.

Unfortunately, the lateral grooves reduce in rigidity of the tread land portions, resulting in deteriorating steering stability on dry roads which is to be expected as an advantage of the four-rib tires.

SUMMARY OF THE DISCLOSURE

In view of the above problems in the conventional art, the present disclosure has an object to provide four-rib tires capable of improving snow performance while maintaining steering stability on dry roads.

According to one aspect of the present disclosure, a tire includes a tread portion having a predetermined orientation for mounting on a vehicle to define an outboard tread edge to be located outwardly of the vehicle and an inboard tread edge to be located inwardly of the vehicle upon being mounted to the vehicle. The tread portion is provided with one circumferentially extending crown main groove, one circumferentially extending outboard shoulder main groove, and one circumferentially extending inboard shoulder main groove to divide the tread portion into an outboard crown land portion, an inboard crown land portion, an outboard shoulder land portion and an inboard shoulder land portion. The inboard shoulder land portion is provided with inboard shoulder lateral grooves connecting the inboard tread edge and the inboard shoulder main groove. The outboard shoulder land portion is provided with outboard shoulder lateral grooves extending axially inwardly from the outboard tread edge and terminating within the outboard shoulder land portion. The inboard crown land portion is provided with inboard crown lateral grooves extending from the inboard shoulder main groove and terminating within the inboard crown land portion. The outboard crown land portion is provided with outboard crown lateral grooves extending from the crown main groove and terminating within the outboard crown land portion.

In another aspect of the disclosure, a ratio W1/W2 of an axial width W1 of the outboard shoulder land portion to an axial width W2 of the outboard crown land portion may be in a range of from 1.0 to 2.0.

In another aspect of the disclosure, each of the inboard crown land portion and the outboard crown land portion may include a rib region on an outboard tread edge side, and the rib region may extend continuously in a tire circumferential direction without being divided by any lateral grooves having widths equal to or more than 2 mm.

In another aspect of the disclosure, the inboard crown land portion may be provided with inboard connecting sipes connecting the crown main groove and the inboard crown lateral grooves.

In another aspect of the disclosure, the outboard crown land portion may be provided with outboard connecting sipes connecting the outboard shoulder main groove and the outboard crown lateral grooves.

In another aspect of the disclosure, each of the inboard crown land portion and the outboard crown land portion may be provided with a circumferentially extending crown longitudinal sipe.

In another aspect of the disclosure, axial lengths of the outboard crown lateral grooves may be smaller than axial lengths of the inboard crown lateral grooves.

In another aspect of the disclosure, the inboard crown land portion may be provided with full-opened sipes traversing completely the inboard crown land portion.

In another aspect of the disclosure, the outboard crown land portion may be provided with semi-opened sipes extending from the crown main groove toward the outboard tread edge and terminating within the outboard crown land portion.

In another aspect of the disclosure, at least one of the outboard shoulder land portion and the inboard shoulder land portion may be provided with a circumferentially extending shoulder longitudinal sipe.

DESCRIPTION OF THE PREFERRED EMBODIMENTS

An embodiment of the present invention will be explained below with reference to the accompanying drawings.

Figure 1:
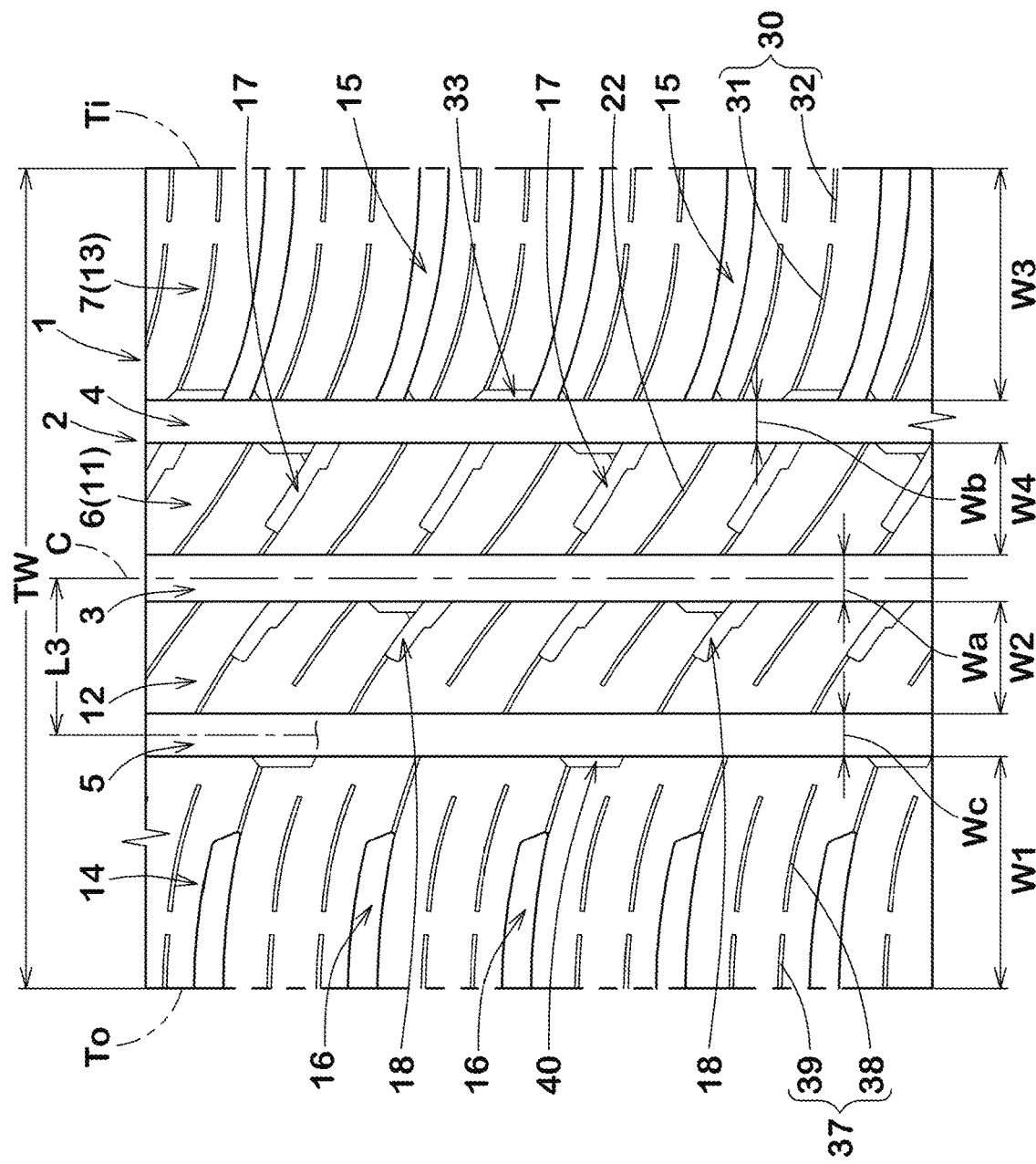
FIG. 1 is a development view of a tread portion of a tire in accordance with an embodiment of the present disclosure.

FIG. 1 illustrates a development view of a tread portion 2 of a tire 1 in accordance with an embodiment of the present disclosure. The tire 1 in accordance with the present embodiment, for example, is used for various types of tires such as pneumatic tires for passenger car and/or heavy-duty vehicle as well as non-pneumatic tires which can support the tire load structurally without being filled with a pressurized air. The tire 1 in accordance with the present embodiment, for example, is suitably embodied as a pneumatic tire for passenger car.

As illustrates in FIG. 1, in this embodiment, the tread portion 2 has a predetermined orientation for mounting on a vehicle to define an outboard tread edge To to be located outwardly of the vehicle and an inboard tread edge Ti to be located inwardly of the vehicle when the tire 1 is mounted on the vehicle. The predetermined orientation for mounting on the vehicle, for example, may be indicated on a sidewall portion (not illustrated) using letters or marks.

As used herein, in the case of a pneumatic tire, the outboard and inboard tread edges To and Ti refer to axially outermost edges of the ground contacting patch of the tread portion 2 which occurs under a normally inflated loaded condition when the camber angle of the tire is zero.

As used herein, the normally inflated loaded condition is such that the tire 1 is mounted onto a standard wheel rim (not illustrated) and inflated to a standard pressure and loaded with a standard tire load.

As used herein, a normal condition of the tire 1 is such that the tire 1 is mounted onto the standard wheel rim and inflated to the standard pressure but loaded with no tire load. In this application including specification and claims, various dimensions, positions and the like of the tire 1 refer to those under the normal condition of the tire unless otherwise noted.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

In this embodiment, the tread portion 2, for example, is provided with one circumferentially and continuously extending crown main groove 3 and two circumferentially and continuously extending shoulder main grooves 4 and 5.

In this embodiment, the crown main groove 3, for example, is provided on the tire equator C.

The shoulder main grooves 4 and 5 are arranged one on each side of the crown main groove 3. The shoulder main grooves 4 and 5, for example, consist of an inboard shoulder main groove 4 arranged between the tire equator C and the inboard tread edge Ti, and an outboard shoulder main groove 5 arranged between the tire equator C and the outboard tread edge To. In some preferred embodiments, each of the main grooves 3 to 5 extends in a straight manner in the tire circumferential direction.

Preferably, each of the inboard shoulder main groove 4 and the outboard shoulder main groove 5, for example, is arranged such that the groove centerline thereof is located at an axial distance L3 of from 0.15 to 0.25 times the tread width TW from the tire equator C. As used herein, the tread width TW is an axial distance from the inboard tread edge Ti to the outboard tread edge To under the normal condition of the tire 1.

Preferably, the crown main groove 3, the inboard shoulder main groove 4 and the outboard shoulder main groove 5, for example, respectively have groove widths Wa, Wb and Wc in a range of from 3.0% to 5.0% of the tread width TW. Thus, wet performance and steering stability may be improved in a well-balanced manner.

The tread portion 2 is divided into two crown land portions 6 and two shoulder land portions 7 by the three main grooves 3 to 5. That is, the tread portion 2 has a four-rib structure. The two crown land portions 6 consist of one crown land portion (hereinafter, it may be referred to as an "inboard crown land portion") 11 disposed on a side of the inboard tread edge Ti with respect to the crown main groove 3 and the other one crown land portion (hereinafter, it may be referred to as an "outboard crown land portion") 12 disposed on a side of the outboard tread edge To with respect to the crown main groove 3.

The two shoulder land portions 7 consist of one shoulder land portion (hereinafter, it may be referred to as an "inboard shoulder land portion") 13 disposed axially outside the crown land portions 7 on a side of the inboard tread edge Ti and an outboard shoulder land portion (hereinafter, it may be referred to as an "outboard shoulder land portion") 14 disposed axially outside the crown land portions 7 on a side of the outboard tread edge To.

In some preferred embodiments, a ratio W1/W2 of an axial width W1 of the outboard shoulder land portion 14 to an axial width W2 of the outboard crown land portion 12 is in a range of from 1.0 to 2.0. Similarly, a ratio W3/W4 of an axial width W3 of the inboard shoulder land portion 13 to an axial width W4 of the inboard crown land portion 11 is in a range of from 1.0 to 2.0. Thus, rigidity balance of the land portions is optimized, leading to better steering stability on dry roads.

Figure 2:
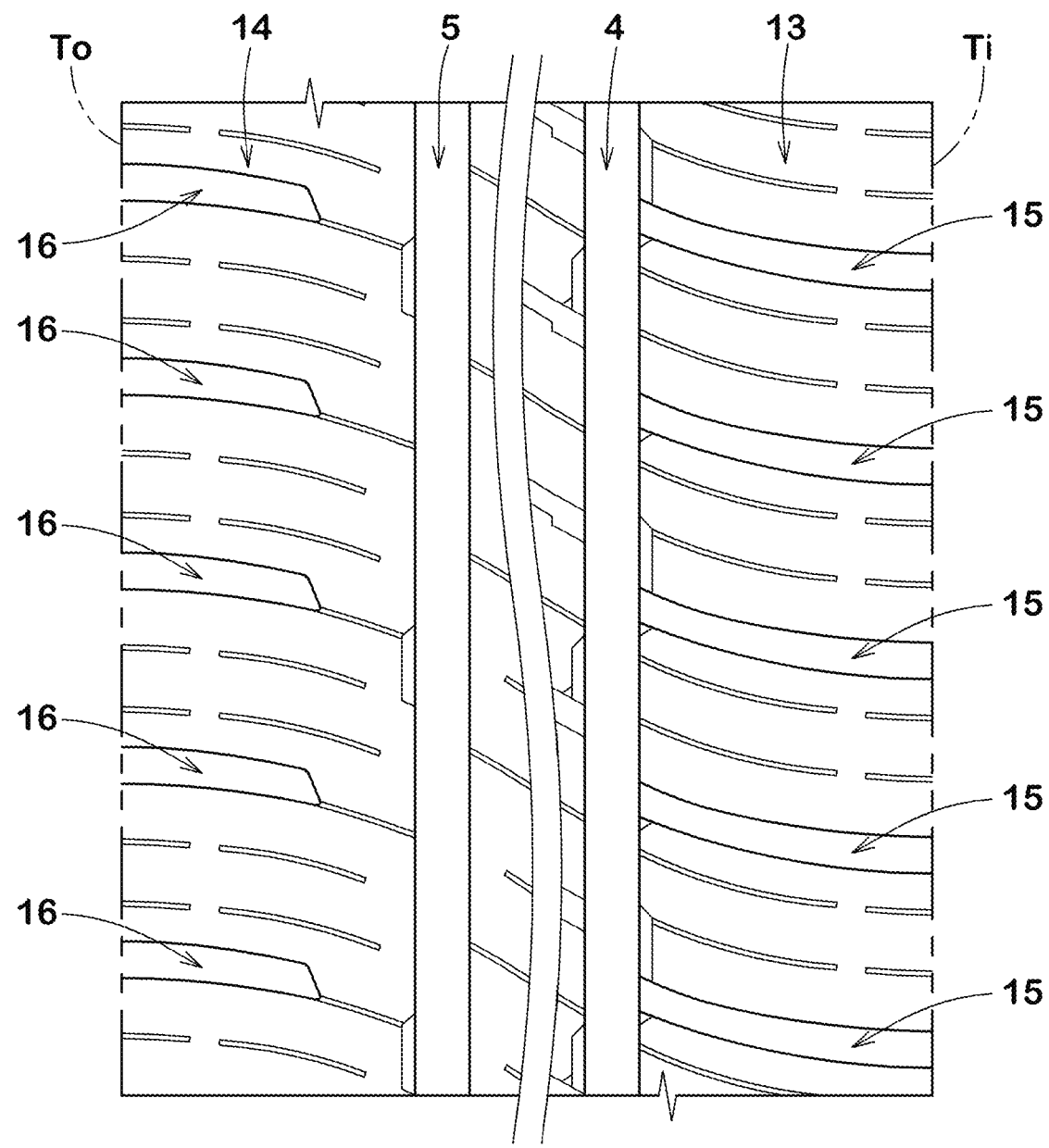
FIG. 2 is an enlarged view of an inboard shoulder land portion and an outboard shoulder land portion.

FIG. 2 illustrates an enlarged view of the inboard shoulder land portion 13 and the outboard shoulder land portion 14. As illustrated in FIG. 2, the inboard shoulder land portion 13 is provided with inboard shoulder lateral grooves 15. The inboard shoulder lateral grooves 15 connects the inboard tread edge Ti and the inboard shoulder main groove 4.

Generally, tires are often used for vehicles with negative camber. Thus, since the inboard shoulder land portion 13 tends to receive relative large ground contact pressure, the inboard shoulder lateral grooves 15 which connect the inboard tread edge Ti and the inboard shoulder main groove 4 can form firmly compressed snow columns and then shear them to generate powerful traction upon driving on snow. Accordingly, snow performance of the tire can be improved.

The outboard shoulder land portion 14 is provided with outboard shoulder lateral grooves 16. The outboard shoulder lateral grooves 16 extend from the outboard tread edge To toward the tire equator C and terminate within the outboard shoulder land portion 14. The outboard shoulder lateral grooves 16 as such can suppress reduction in rigidity of the outboard shoulder land portion 14, resulting in offering better steering stability on dry roads.

Figure 3:
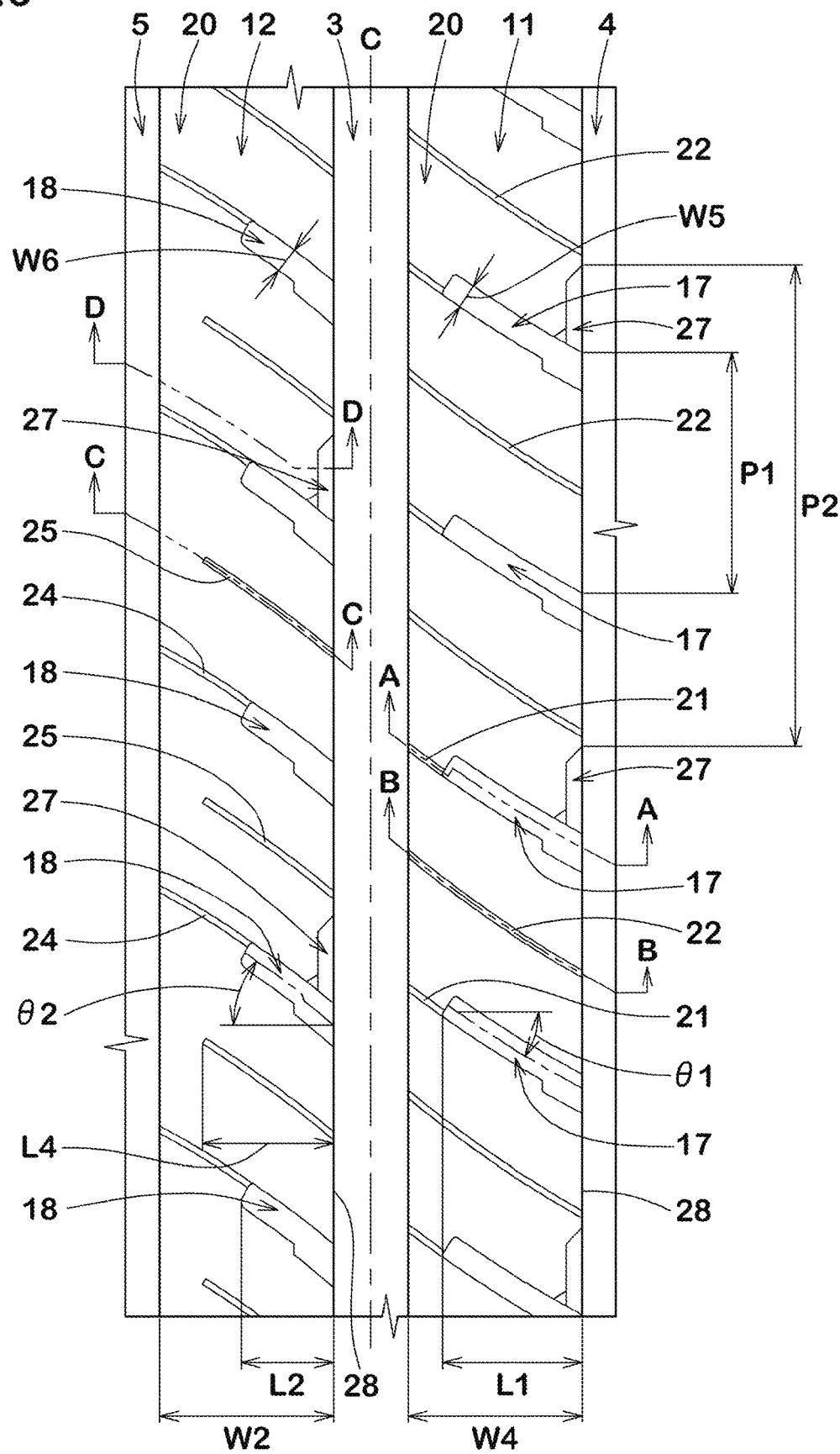
FIG. 3 is an enlarged view of an inboard crown land portion and an outboard crown land portion.

FIG. 3 illustrates an enlarged view of the inboard crown land portion 11 and the outboard crown land portion 12. As illustrated in FIG. 3, the inboard crown land portion 11 is provided with inboard crown lateral grooves 17. The inboard crown lateral grooves 17 extend from the inboard shoulder main groove 4 and terminate within the outboard crown land portion 12.

The outboard crown land portion 12 is provided with outboard crown lateral grooves 18. The outboard crown lateral grooves 18 extend from the crown main groove 3 and terminate within the outboard crown land portion 12.

The inboard and outboard crown lateral grooves 17 and 18 can be useful to maintain sufficient rigidity on an outboard tread edge To side of the inboard and outboard crown land portions 11 and 12, respectively, resulting in maintaining superior steering stability on dry roads as being expected to four-rib tires. Further, since the inboard and outboard crown lateral grooves 17 and 18 are arranged on an inboard tread edge Ti side which may receive relatively large ground contact pressure, strongly compressed snow columns can be formed by the lateral grooves 17 and 18, and thus snow driving performance can be improved.

Preferably, the inboard crown lateral grooves 17 and the outboard crown lateral grooves 18, for example, extend obliquely to the tire axial direction. In this embodiment, the inboard crown lateral grooves 17 are inclined in the same direction as the outboard crown lateral grooves 18 with respect to the tire axial direction.

Angles θ1 of the inboard crown lateral grooves 17 to the tire axial direction and angles θ2 of the outboard crown lateral grooves 18 to the tire axial direction are preferably equal to or more than 10 degrees, more preferably equal to or more than 20 degrees, but preferably equal to or less than 60 degrees, more preferably equal to or less than 45 degrees, further preferably equal to or less than 30 degrees. The inboard and outboard crown lateral grooves 17 and 18 as such, upon driving on snow roads, may generate powerful snow shearing force in the tire circumferential and axial directions in a well-balanced manner.

In some preferred embodiments, the inboard crown lateral grooves 17 may curve smoothly such that the angles θ1 increase gradually toward the outboard tread edge To. In some preferred embodiments, the outboard crown lateral grooves 18 may curve smoothly such that the angles θ2 decrease gradually toward the outboard tread edge To.

In order to improve steering stability on dry roads and snow performance in a well-balanced manner, the inboard crown lateral grooves 17 preferably have axial lengths L1 in a range of from 0.55 to 0.92 times the axial width W4 of the inboard crown land portion 11, and the outboard crown lateral grooves 18 preferably have axial lengths L2 in a range of from 0.45 to 0.70 times the axial width W2 of the outboard crown land portion 12.

In some preferred embodiments, the axial lengths L2 of the outboard crown lateral grooves 18 are smaller than the axial lengths L1 of the inboard crown lateral grooves 17. More preferably, the axial lengths L2 of the outboard crown lateral grooves 18, for example, are in a range of from 0.60 to 0.70 times the axial lengths L1 of the inboard crown lateral grooves 17. Due to such outboard crown lateral grooves 18, the outboard crown land portion 12 may have sufficient high rigidity, resulting in improving steering stability on dry roads.

Preferably, widths W5 of the inboard crown lateral grooves 17 and widths W6 of the outboard crown lateral grooves 18, for example, are in a range of from 2.2% to 6.7% of the tread width TW (see FIG. 1 and the same hereinafter). Preferably, depths d3 (shown in FIG. 4A) of the inboard crown lateral grooves 17 and depths d4 (not illustrated) of the outboard crown lateral grooves 18, for example, are in a range of from 0.66 to 0.83 times the depth d1 of the crown main groove 3. In some further preferred embodiments, the widths W5 and W6, for example, can increase in a step manner on the inboard tread edge Ti side.

In some preferred embodiments, each of the inboard crown land portion 11 and the outboard crown land portion 12 includes a rib region 20 on the outboard tread edge To side, and the rib region 20 may extend continuously in the tire circumferential direction without being divided by any lateral grooves having widths equal to or more than 2 mm. The rib region 20 has high rigidity which improves further steering stability on dry roads.

In some preferred embodiments, the inboard crown land portion 11 may be provided with inboard connecting sipes 21 and/or full-opened sipes 22. As used herein, a "sipe" means a narrow cut or incision that has its width less than 2 mm.

The inboard connecting sipes 21, for example, connect the crown main groove 3 and the inboard crown lateral grooves 17. Preferably, the inboard connecting sipes 21, for example, are inclined in the same direction as the inboard crown lateral grooves 17. In some further preferred embodiments, each of the inboard connecting sipes 21 extends to be continuous smoothly to one of groove edges of one inboard crown lateral groove 17 so as to form a single groove edge together.

Figure 4A:
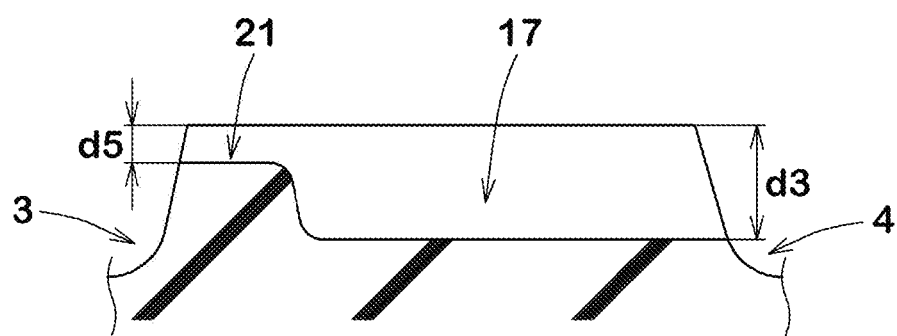
FIGS. 4A and 4B are cross-sectional views taken along lines A-A and B-B of FIG. 3, respectively.

FIG. 4A illustrates a cross-sectional view of one inboard crown lateral groove 17 and one inboard connecting sipe 21 taken along line A-A of FIG. 3. As illustrated in FIG. 4A, preferably, the inboard connecting sipes 21 each have a depth d5 in a range of from 0.30 to 0.50 times the depth d3 of the inboard crown lateral groove 17 to which the inboard connecting sipe 21 is connected.

As illustrated in FIG. 3, the full-opened sipes 22 traverse the inboard crown land portion 11 completely. In some preferred embodiments, the inboard crown lateral grooves 17 and the full-opened sipes 22 are arranged alternately in the tire circumferential direction. The full-opened sipes 22 as such can scratch the ground, resulting in improving wet and icy road performance of the tire.

Preferably, the full-opened sipes 22, for example, are inclined with respect to the tire axial direction in the same direction as the inboard crown lateral grooves 17. In this embodiment, the full-opened sipes 22, for example, extend along the inboard crown lateral grooves 17. The full-opened sipes 22 as such can suppress uneven wear of the land portion.

Figure 4B:
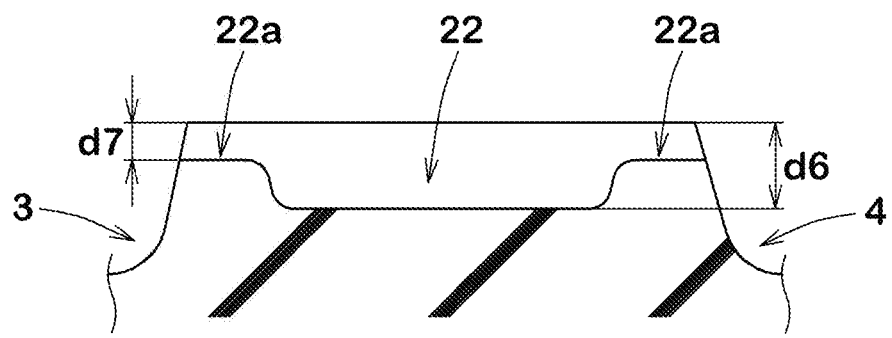

FIG. 4B illustrates a cross-sectional view of one full-opened sipe 22 taken along line B-B of FIG. 3. As illustrated in FIG. 4B, the full-opened sipes 22 each preferably have the maximum depth d6 of from 0.60 to 0.90 times the depths d3 (shown in FIG. 4A) of the inboard crown lateral grooves 17, for example.

In this embodiment, the full-opened sipes 22, for example, each have axial both end portions 22a whose bottoms locally protrude radially outwardly. Preferably, the end portions 22a have depths d7 in a range of from 0.30 to 0.50 times the maximum depths d6. Thus, the full-opened sipes 22 can be useful to increase in rigidity of the land portion.

As illustrated in FIG. 3, the outboard crown land portion 12 is provided with outboard connecting sipes 24 and/or semi-opened sipes 25.

The outboard connecting sipes 24, for example, connect the outboard shoulder main groove 5 and the outboard crown lateral grooves 18. Preferably, the outboard connecting sipes 24, for example, are inclined in the same direction as the outboard crown lateral grooves 18. In some preferred embodiments, the outboard connecting sipes 24 extend to be continuous smoothly to one of groove edges of one outboard crown lateral groove 18 so as to form a single groove edge together. The outboard connecting sipes 24 may be useful to suppress uneven wear of the land portion.

The semi-opened sipes 25 extend from the crown main groove 3 toward the outboard tread edge To and terminate within the outboard crown land portion 12. In some preferred embodiments, the outboard crown lateral grooves 18 and the semi-opened sipes 25 are arranged alternately in the tire circumferential direction.

Preferably, the semi-opened sipes 25, for example, are inclined in the same direction as the outboard crown lateral grooves 18 with respect to the tire axial direction. In this embodiment, the semi-opened sipes 25, for example, extend along the outboard crown lateral grooves 18. The semi-opened sipes 25 can improve wet and icy road performance in cooperation with the outboard crown lateral grooves 18.

Preferably, the semi-opened sipes 25, for example, have axial lengths L4 in a range of from 0.70 to 0.85 times the axial width W2 of the outboard crown land portion 12.

Figure 5A:
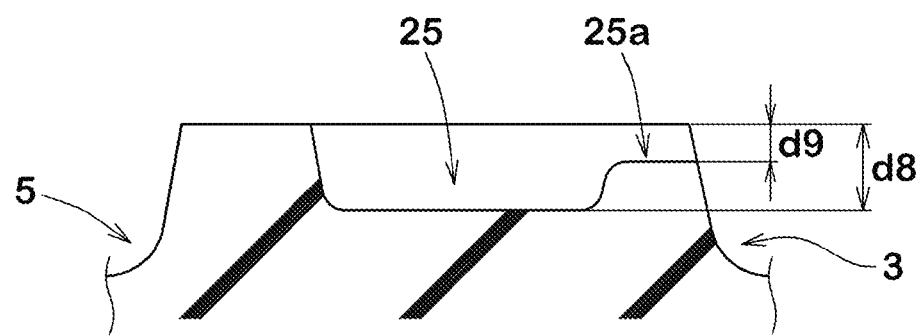
FIGS. 5A and 5B are cross-sectional views taken along lines C-C and D-D of FIG. 3, respectively.

FIG. 5A illustrates a cross-sectional view of one semi-opened sipe 25 taken along line C-C of FIG. 3. As illustrated in FIG. 5A, the semi-opened sipes 25, for example, have maximum depths d8 of from 0.50 to 0.70 times the depths d4 (not illustrated) of the outboard crown lateral grooves 18.

In this embodiment, the semi-opened sipes 25, for example, each have one end portion 25a whose bottoms locally protrudes radially outwardly, and the one end portion 25a is located on the side of the crown main groove 3. The depth d9 of the end portion 25a, for example, is preferably of from 0.30 to 0.50 times the maximum depth d8 of the semi-opened sipe 25. Thus, sufficient rigidity of the outboard crown land portion 12 can be maintained, resulting in improving steering stability on dry roads and snow performance in a well-balanced manner.

Figure 5B:
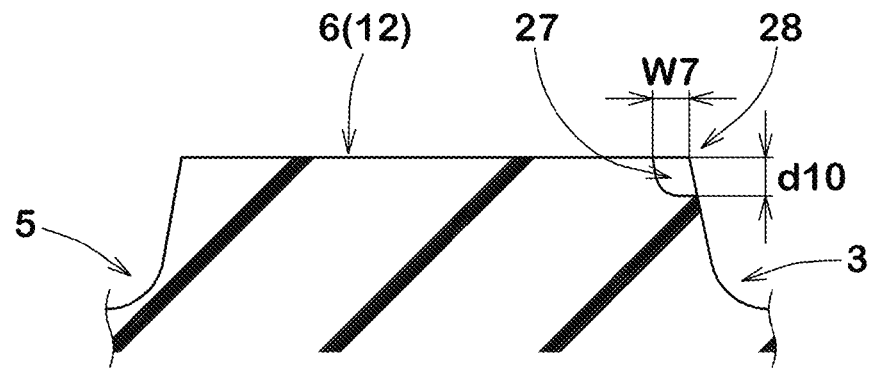

As illustrated in FIG. 3, in some preferred embodiments, at least one of the inboard and outboard crown land portions 11 and 12, crown chamfered portions 27 may be provided. FIG. 5B illustrates a cross-sectional view of one crown chamfered portion 27 taken along line D-D of FIG. 3. As illustrated in FIG. 5B, each of the crown chamfered portions 27, for example, is a portion recessed partly of the corner portion 28 between the ground contact surface of the land portion 6 and a land portion sidewall. The crown chamfered portions 27 may be useful to suppress uneven wear of the crown land portions.

In order to further improve the above-mentioned effect, the crown chamfered portions 27 each preferably have an axial width W7 of from 1.0 to 3.0 mm. The crown chamfered portions 27 each may have a depth d10 of from 1.0 to 2.5 mm, for example.

As illustrated in FIG. 3, the crown chamfered portions 27, for example, are arranged on acute-angle portions formed between one inboard crown lateral groove 17 and the inboard shoulder main groove 4 on the inboard crown land portion 11 and/or formed between one outboard crown lateral groove 18 and the crown main groove 3 on the outboard crown land portion 12. The crown chamfered portion portions 27 can suppress uneven wear of the crown land portions and can be useful to form large snow columns in cooperation with the inboard or outboard crown lateral grooves and main grooves together upon driving on snow roads.

Preferably, the crown chamfered portions 27, for example, are arranged at greater pitches P2 in the tire circumferential direction than that of the inboard crown lateral grooves 17. In this embodiment, the pitches P2 of the crown chamfered portions 27, for example, are approximately double of the pitches P1 of the inboard crown lateral grooves 17. The crown chamfered portions 27 as such can improve steering stability on dry roads and snow performance in a well-balanced manner.

Figure 6:
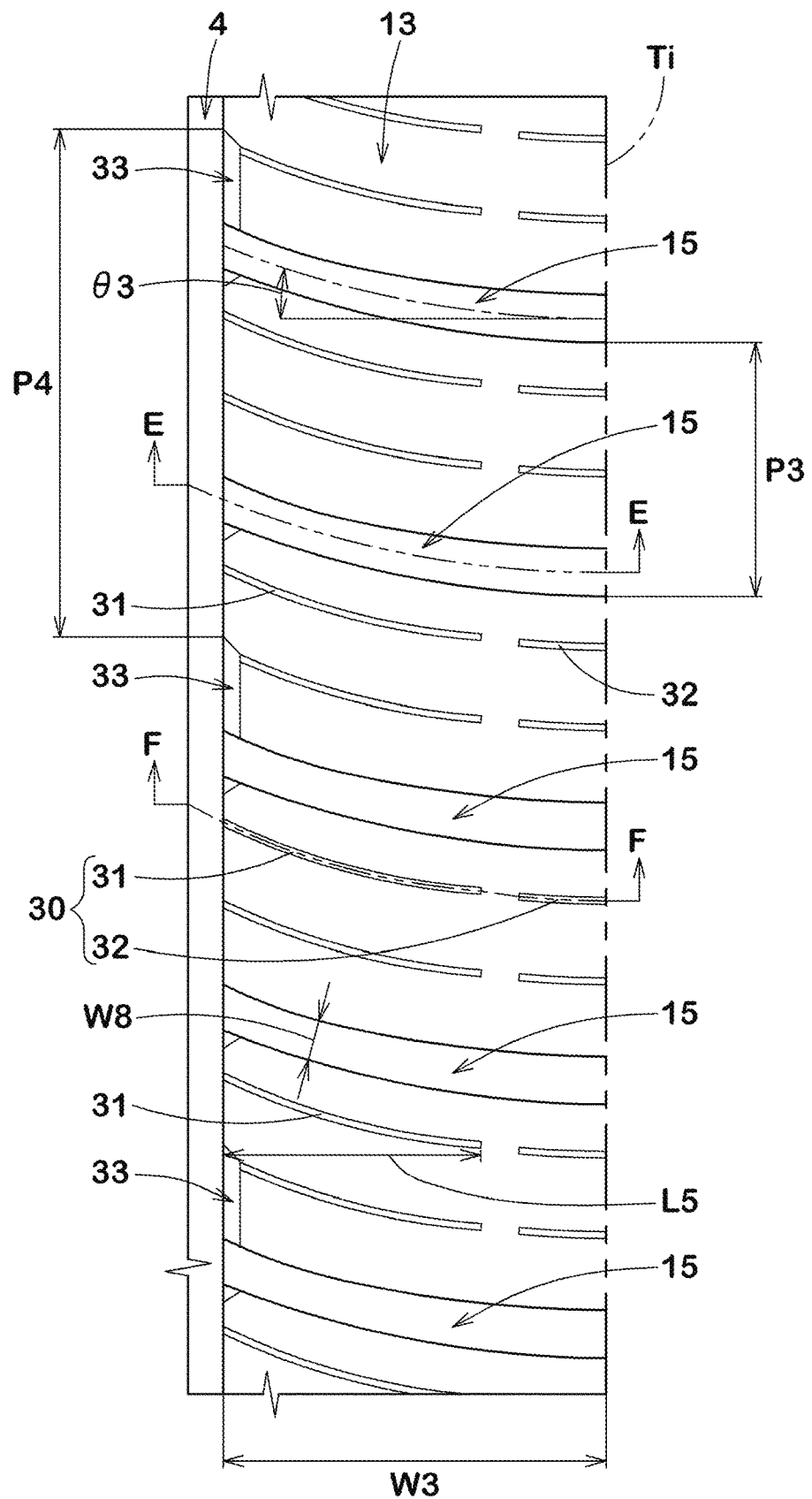
FIG. 6 is a partial enlarged view of the inboard shoulder land portion in FIG. 1.

FIG. 6 illustrates a partial enlarged view of the inboard shoulder land portion 13. As illustrated in FIG. 6, the inboard shoulder lateral grooves 15, for example, extend obliquely to the tire axial direction. In some preferred embodiments, the inboard shoulder lateral grooves 15 are inclined in the same direction as the inboard crown lateral grooves 17. The inboard shoulder lateral grooves 15 as such may generate snow shearing force in the same direction as the inboard crown lateral grooves 17, leading to better snow performance.

Angles θ3 of the inboard shoulder lateral grooves 15 with respect to the tire axial direction are preferably smaller than the angles θ1 and θ2 of the inboard and outboard crown lateral grooves 17 and 18, respectively. Specifically, the angles θ3 are preferably equal to or more than 5 degrees, more preferably equal to or more than 10 degrees, but preferably equal to or less than 45 degrees, more preferably equal to or less than 30 degrees. The inboard shoulder lateral grooves 15 as such can generate powerful traction on snow in cooperation with the inboard and outboard crown lateral grooves 17 and 18.

In order to further improve the above-mentioned effect, in some preferred embodiments, the inboard shoulder lateral grooves 15 may be curved smoothly such that the angles θ3 increase gradually toward the tire equator C.

In order to improve steering stability on dry roads and snow performance in a well-balanced manner, groove widths W8 of the inboard shoulder lateral grooves 15 are preferably in a range of from 3.0% to 3.6% of the tread width TW.

Figure 7A:
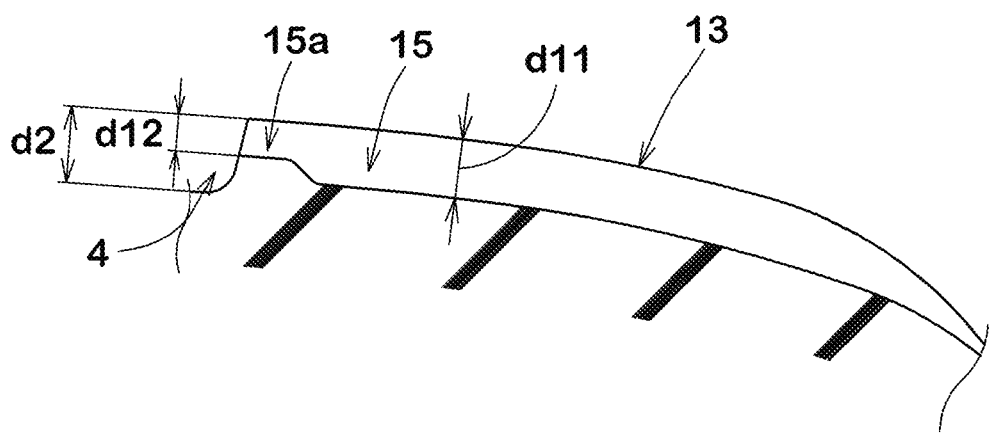
FIGS. 7A and 7B are cross-sectional views taken along lines E-E and F-F of FIG. 6, respectively.

FIG. 7A illustrates a cross-sectional view of one inboard shoulder lateral groove 15 taken along line E-E of FIG. 6. As illustrated in FIG. 7A, the inboard shoulder lateral grooves 15 preferably each have a maximum depth d11 of from 0.73 to 0.83 times the depth d2 of the inboard shoulder main groove 4, for example.

The inboard shoulder lateral grooves 15, for example, each have an axially inner end portion 15a whose bottom locally protrudes radially outwardly. Preferably, the depth d12 of the inner end portion 15a is of from 0.50 to 0.70 times the maximum depth d11 of the inboard shoulder lateral groove 15. The inboard shoulder lateral grooves 15 as such can be useful to maintain sufficient rigidity of the inboard shoulder land portion 13, resulting in improving steering stability on dry roads.

As illustrated in FIG. 6, the inboard shoulder land portion 13 is provided with one or more inboard shoulder sipes 30.

One or more inboard shoulder sipes 30, for example, are arranged between circumferentially adjacent inboard shoulder lateral grooves 15. In this embodiment, a plurality of inboard shoulder sipes 30 is arranged between circumferentially adjacent inboard shoulder lateral grooves 15.

The inboard shoulder sipes 30, for example, include first inboard shoulder sipes 31 and second inboard shoulder sipes 32. The first inboard shoulder sipes 31, for example, each extend from the shoulder main groove 4 toward the inboard tread edge Ti and terminate within the inboard shoulder land portion 13. The second inboard shoulder sipes 32, for example, each extend from at least the inboard tread edge Ti toward the shoulder main groove 4 and terminate short of the first inboard shoulder sipes 31. The first inboard shoulder sipes 31 and the second inboard shoulder sipes 32, for example, extend along the inboard shoulder lateral grooves 15. The inboard shoulder sipes 30 as such can improve wet performance and icy road performance while maintaining sufficient rigidity of the inboard shoulder land portion 13.

In order to further improve the above-mentioned effect, the first inboard shoulder sipes 31 preferably have axial lengths L5 of from 0.70 to 0.80 times the axial width W3 of the inboard shoulder land portion 13.

Figure 7B:
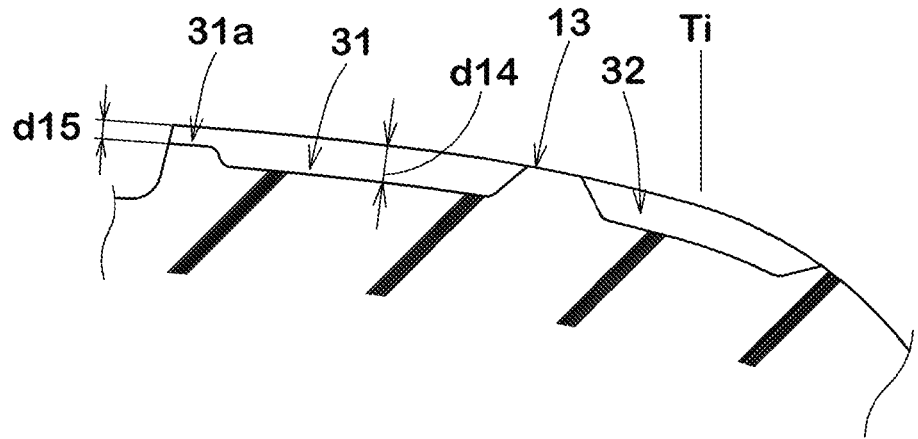

FIG. 7B illustrates a cross-sectional view of one first inboard shoulder sipe 31 and one second inboard shoulder sipe 32 taken along line F-F of FIG. 6. As illustrated in FIG. 7B, each of the first inboard shoulder sipes 31, for example, has an axially inner end portion 31a whose bottom protrudes locally radially outwardly. The depth d15 of the inner end portion 31a, for example, is preferably of from 0.40 to 0.60 times the maximum depth d14 of the first inboard shoulder sipe 31. The first inboard shoulder sipes 31 can be useful to maintain sufficient rigidity of the inboard shoulder land portion 13 in cooperation with the above mentioned inboard shoulder lateral grooves 15, resulting in improving steering stability on dry roads.

In this embodiment, the second inboard shoulder sipes 32 preferably extend axially outwardly beyond the inboard tread edge Ti. The second inboard shoulder sipes 32 as such may be useful to deliver an excellent wandering resistance.

As illustrated in FIG. 6, in some preferred embodiments, the inboard shoulder land portion 13 may be provided with one or more inboard shoulder chamfered portions 33. The inboard shoulder chamfered portions 33, for example, have the same cross-sectional shape as the crown chamfered portions 27. By providing the inboard shoulder chamfered portions 33, the inboard shoulder main groove 4 can form a large snow column when driving on snow, resulting in improving snow performance.

Preferably, the inboard shoulder chamfered portions 33 each are provided on a region between adjacent one inboard shoulder lateral groove 15 and one first inboard shoulder sipe 31, for example. As illustrated in FIG. 1, in some preferred embodiments, the inboard shoulder chamfered portions 33 are arranged such that each of the inboard shoulder chamfered portions 33 faces either one of the inboard crown lateral grooves 17 in the tire axial direction. Thus, the inboard shoulder chamfered portions 33 which are in communication with the inboard shoulder main groove 4 can be useful to form a large snow column.

As illustrated in FIG. 6, the inboard shoulder chamfered portions 33, for example, are arranged at greater pitches P4 in the tire circumferential direction than circumferential pitches P3 of the inboard shoulder lateral grooves 15. In this embodiment, the pitches P4 of the inboard shoulder chamfered portions 33, for example, are approximately double of the pitches P3 of the inboard shoulder lateral grooves 15. The inboard shoulder chamfered portions 33 as such can improve steering stability on dry roads and snow performance in a well-balanced manner.

Figure 8:
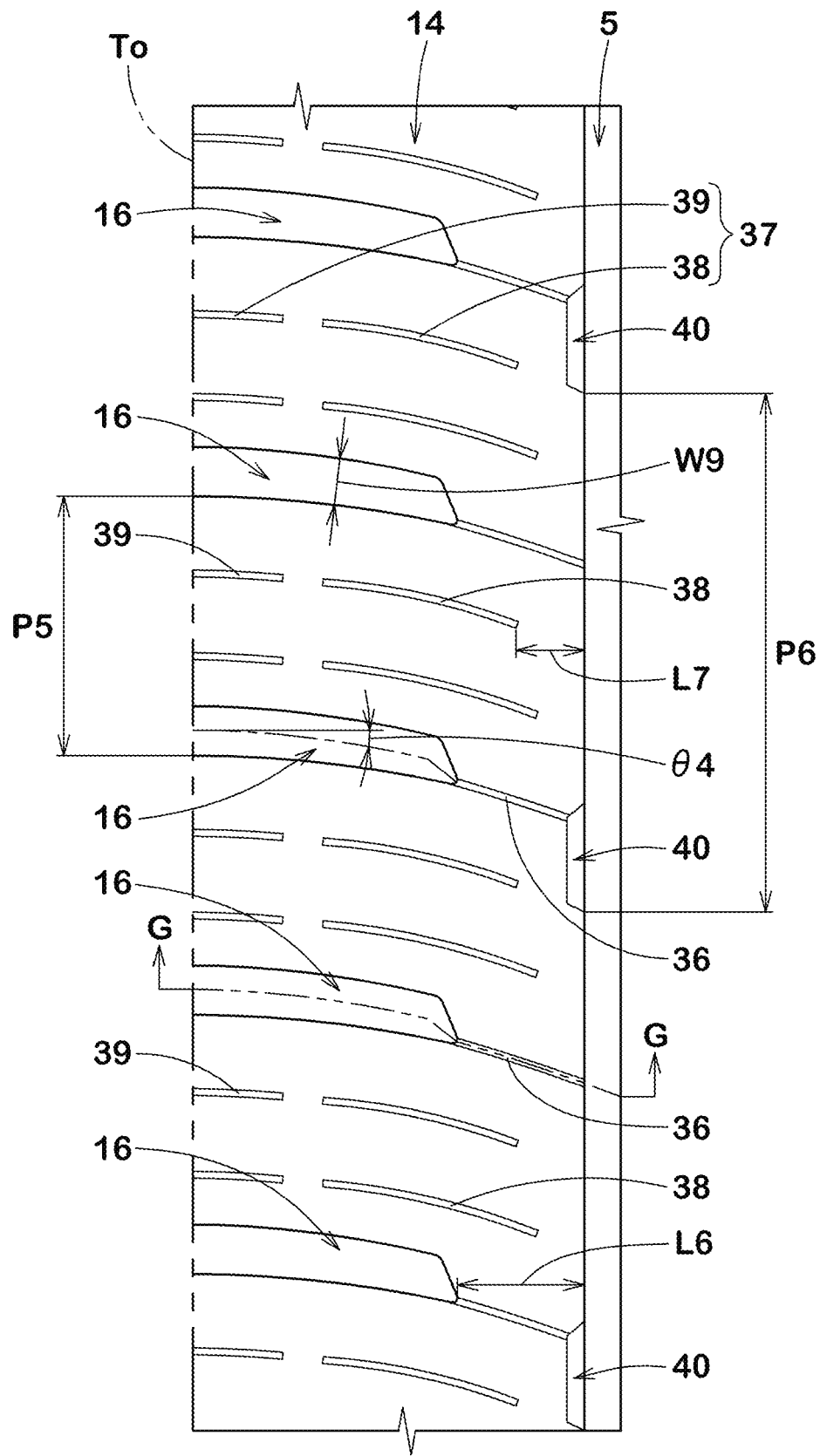
FIG. 8 is a partial enlarged view of FIG. 1 for illustrating the outboard shoulder land portion.

FIG. 8 illustrates an enlarged view of the outboard shoulder land portion 14. As illustrated in FIG. 8, the outboard shoulder lateral grooves 16, for example, extend obliquely with respect to the tire axial direction. In some preferred embodiments, the outboard shoulder lateral grooves 16, for example, are inclined in the same direction as the outboard crown lateral grooves 18.

Angles θ4 of the outboard shoulder lateral grooves 16 with respect to the tire axial direction, for example, are preferably smaller than the angles θ1 and θ2 of the inboard and outboard crown lateral grooves 17 and 18, respectively. Specifically, the angles θ4 are preferably equal to or more than 5 degrees, more preferably equal to or more than 10 degrees, but preferably equal to or less than 45 degrees, more preferably equal to or less than 30 degrees. The outboard shoulder lateral grooves 16 can improve traction on snow roads.

In order to further improve the above-mentioned effect, in some preferred embodiments, the outboard shoulder lateral grooves 16 may be curved smoothly such that the angles θ4 increase gradually toward the tire equator C.

In order to improve steering stability on dry roads and snow performance in a well-balanced manner, groove widths W9 of the outboard shoulder lateral grooves 16 are preferably in a range of from 3.0% to 3.6% of the tread width TW, for example. Depths d16 (shown in FIG. 9) of the outboard shoulder lateral grooves 16 are preferably of from 0.73 to 0.83 times the depth d2 of the outboard shoulder main groove 5, for example. Preferably, axial lengths L6 from the axially inner ends of the outboard shoulder lateral grooves 16 to the outboard shoulder main groove 5, for example, are in a range of from 3.0% to 3.6% of the tread width TW.

In some preferred embodiments, one or more shoulder connecting sipes 36 may be provided to connect one or more outboard shoulder lateral grooves 16 to the outboard shoulder main groove 5. In this embodiment, each of the shoulder connecting sipes 36 extends to be continuous smoothly to one of groove edges of one outboard shoulder lateral groove 16 so as to form a single groove edge together. The shoulder connecting sipes 36 as such may be useful to suppress uneven wear of the land portion.

Figure 9:
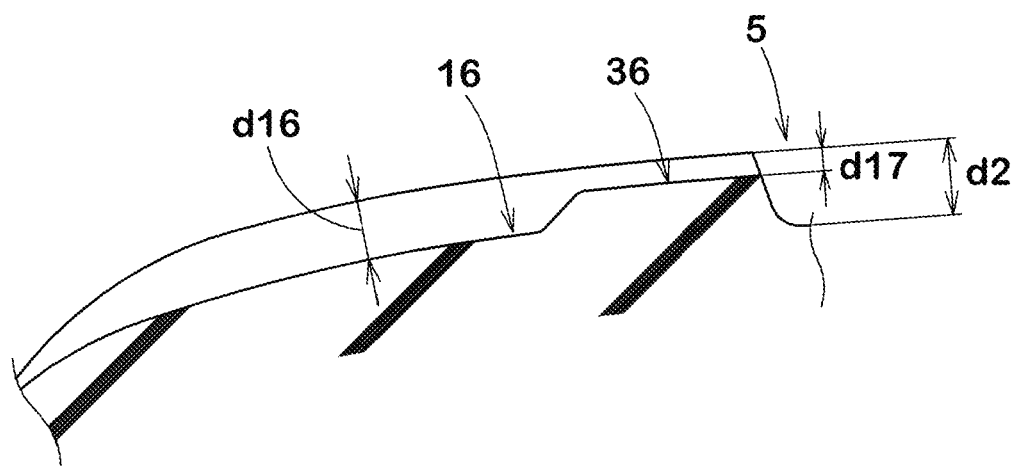
FIG. 9 is a cross-sectional view taken along line G-G of FIG. 8.

FIG. 9 illustrates a cross-sectional view of one outboard shoulder lateral groove 16 and one shoulder connecting sipe 36 taken along line G-G of FIG. 8. As illustrates in FIG. 9, each shoulder connecting sipe 36, for example, has a depth d17 of from 0.20 to 0.40 times the maximum depth d16 of the outboard shoulder lateral groove 34 to which the shoulder connecting sipe 36 connects. The shoulder connecting sipes 36 as such may improve wet and icy road performance due to the sipe edge while maintaining sufficient rigidity of the land portion.

As illustrated in FIG. 8, the outboard shoulder land portion 14 is provided with one or more outboard shoulder sipes 37.

One or more outboard shoulder sipes 37, for example, are provided between circumferentially adjacent outboard shoulder lateral grooves 16. In this embodiment, a plurality of outboard shoulder sipes 37 is provided between circumferentially adjacent outboard shoulder lateral grooves 16. The outboard shoulder sipes 37 extend along the outboard shoulder lateral grooves 16.

The outboard shoulder sipes 37, for example, include first outboard shoulder sipes 38 and second outboard shoulder sipes 39. The first outboard shoulder sipes 38, for example, are configured as closed sipes which have both ends terminated within the outboard shoulder land portion 14. The second outboard shoulder sipes 39, for example, extend from at least the outboard tread edge To toward the outboard shoulder main groove 5 and terminate short of the first outboard shoulder sipes 38. The outboard shoulder sipes 37 as such can improve wet performance and icy road performance while maintaining rigidity of the outboard shoulder land portion 14.

Preferably, axial maximum distances L7 from the axially inner ends of the respective first outboard shoulder sipes 38 to the outboard shoulder main groove 5 are in a range of from 2.0% to 7.0% of the tread width TW, for example.

In some preferred embodiments, the outboard shoulder land portion 14 may be provided with one or more outboard shoulder chamfered portions 40. The outboard shoulder chamfered portions 40, for example, have the same cross-sectional shape as the crown chamfered portions 27.

Each of the outboard shoulder chamfered portions 40, for example, is preferably in communication with one shoulder connecting sipe 36. The outboard shoulder chamfered portions 40 as such may be useful to form a large snow column in cooperation with the outboard shoulder main groove 5, resulting in improving snow performance when driving on snow roads.

As illustrated in FIG. 1, preferably, one or more outboard shoulder chamfered portions 40 are arranged so as to face a land sidewall of the outboard crown land portion 11 to which no grooves or sipes are connected. Thus, the outboard shoulder chamfered portions 40 as such may be useful to form a firmly compressed snow column in cooperation with the land sidewall of the outboard crown land portion 11

As illustrated in FIG. 8, the outboard shoulder chamfered portion 40, for example, are arranged at circumferential pitches P6 which are greater than circumferential pitches P5 of the outboard shoulder lateral grooves 16. In this embodiment, the pitches P6 of the outboard shoulder chamfered portions 40, for example, are approximately double of the pitches P5 of the outboard shoulder lateral grooves 16. The outboard shoulder chamfered portions 40 as such can improve steering stability on dry roads and snow performance in a well-balanced manner.

Figure 10:
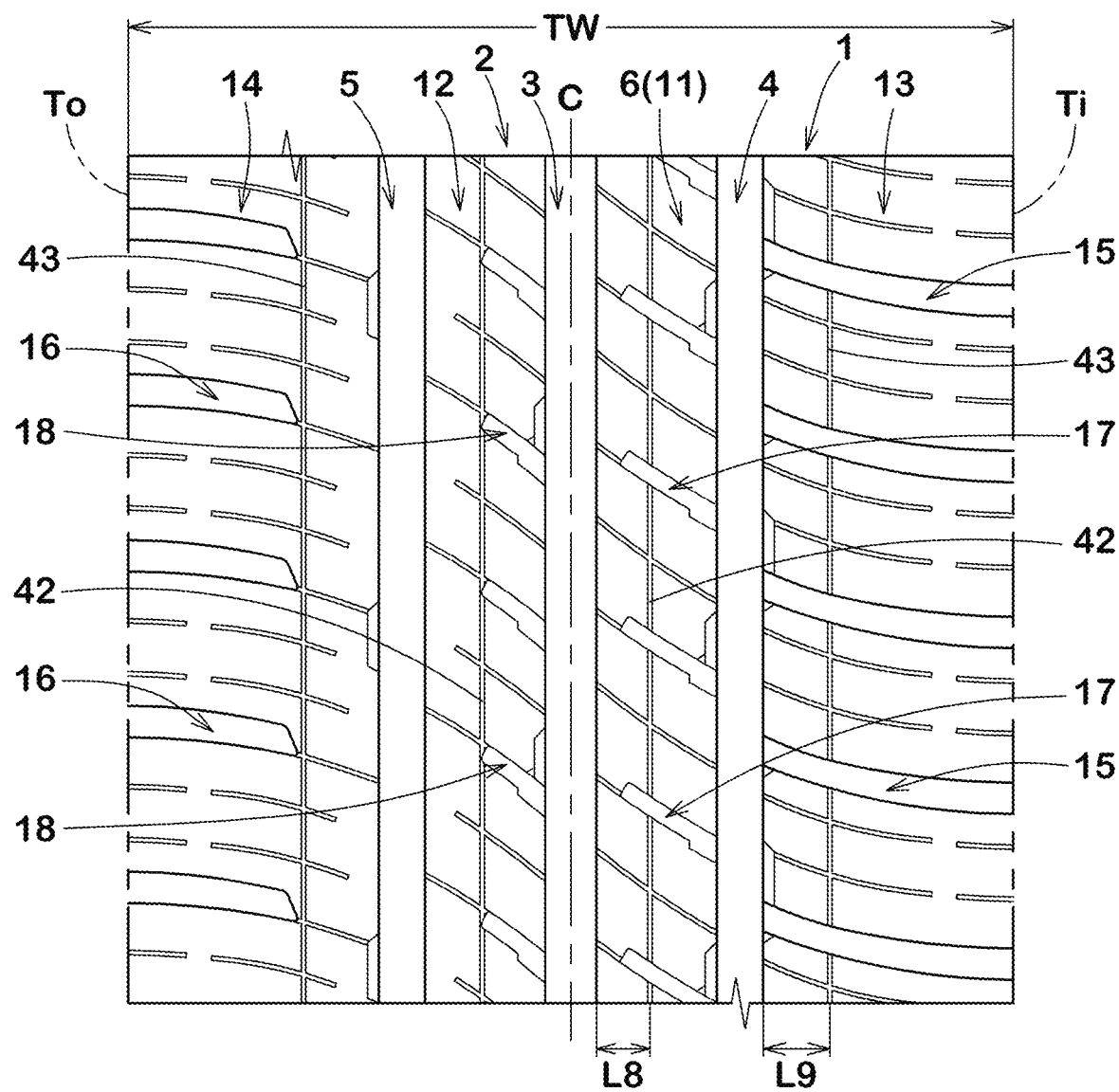
FIG. 10 is a development view of a tread portion of a tire in accordance with another embodiment of the present disclosure.

FIG. 10 illustrates a development view of the tread portion 2 of the tire 1 in accordance with another embodiment of the present disclosure. In FIG. 10, note that the same reference numerals indicate common or similar constituent elements, and the detailed description of the same constituent elements is omitted.

As illustrated in FIG. 10, in this embodiment, at least one of the inboard and outboard crown land portions 11 and 12, one or more circumferentially extending crown longitudinal sipes 42 are provided. In some preferred embodiments, on both inboard and outboard crown land portions 11 and 12, one or more circumferentially extending crown longitudinal sipes 42 are provided. The crown longitudinal sipes 42 provide circumferential extending sipe edges to increase axial friction force, and thus improving cornering performance on wet and icy road conditions.

In this embodiment, the crown longitudinal sipes 42 are preferably arranged on the axially middle regions of the inboard and outboard crown land portions 11 and 12. Specifically, the crown longitudinal sipes 42 are preferably located away from the crown main groove 3 by an axial distance L8 of from 0.4 to 0.6 times the respective widths of the inboard and outboard crown land portions 11 and 12.

In this embodiment, at least one of the inboard and outboard shoulder land portions 13 and 14, one or more circumferentially extending shoulder longitudinal sipes 43 are provided. In some preferred embodiments, on both inboard and outboard shoulder land portions 13 and 14, one or more circumferentially extending shoulder longitudinal sipes 43 are provided. Thus, the above-mentioned effect can be improved further.

In some preferred embodiments, the shoulder longitudinal sipes 43 are located away from the respective inboard and outboard shoulder main grooves 4 and 5 by an axial distance L9 of from 6.0% to 10.0% of the tread width TW, for example. The shoulder longitudinal sipes 43 can improve cornering performance on wet and icy road conditions while maintaining sufficient rigidity of the land portions.

While the particularly preferable embodiments in accordance with the present invention have been described in detail, the present invention is not limited to the illustrated embodiments but can be modified and carried out in various aspects.

Example

Figure 11:
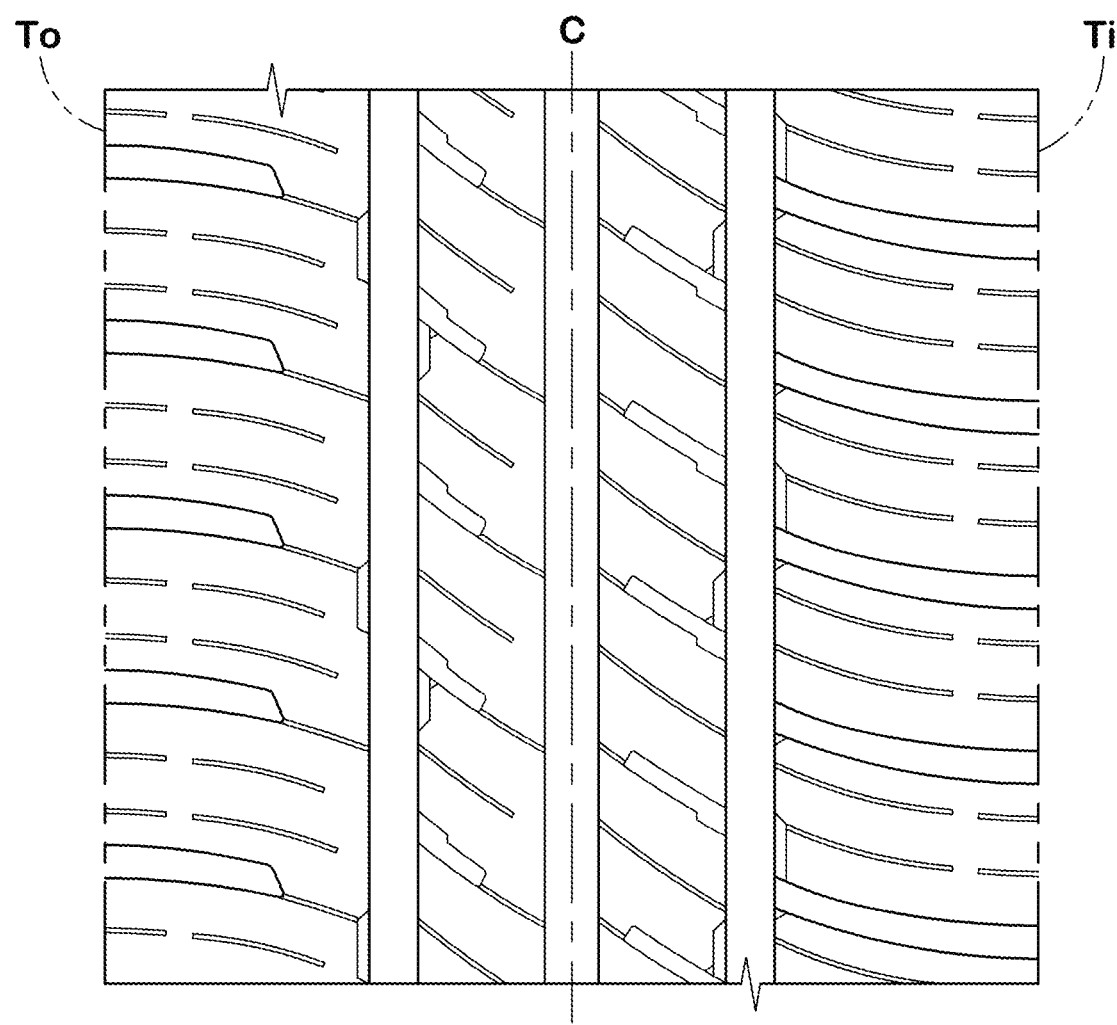
FIG. 11 is a development view of a tread portion of a tire in accordance with a comparative example.

Pneumatic tires 185/65R15 with a basic tread pattern as shown in FIG. 1 or FIG. 10 were manufactured by way of trial based on the specification in Table 1. A tire provided with outboard crown lateral grooves which extend from the outboard shoulder main groove and terminate within the outboard crown land portion was also manufactured as a comparative example, as illustrated in FIG. 11. Then, steering stability on dry roads and snow performance of each test tire was tested. The common specification and the testing method of the test tires are as follows.

Rim size: 15×6.0 J
Tire inner pressure (front/rear): 220 kPa/210 kPa
Test vehicle: front-drive vehicle with 1300 cc displacement
Tire location(s): all wheels
Test for Steering Stability on Dry Roads:

A test driver drove the test vehicle on a dry pavement road, and then evaluated steering stability of the vehicle by the driver's sense. The test results are shown in Table 1 by a point score system in which the comparative example (Ref.) is assumed to be 100. The larger numeric value indicates better steering stability on dry roads.

Test for Snow Performance:

A test driver drove the test vehicle on a snowy road, and then evaluated traction, braking and cornering performance by the driver's sense. The test results are shown in Table 1 by a point score system in which the comparative example (Ref.) is assumed to be 100. The larger numeric value indicates better snow performance.

Table 1 shows the test results.

TABLE 1

|  | Ref. | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Tread pattern | FIG. 11 | FIG. 1 | FIG. 1 | FIG. 1 | FIG. 1 | FIG. 1 | FIG. 1 | FIG. 1 | FIG. 1 |
| Outboard shoulder land portion width W1/outboard crown land portion width W2 | 1.8 | 1.8 | 1.8 | 1.8 | 1.8 | 1.8 | 1.8 | 1.8 | 1.8 |
| Inboard crown lateral groove lengths L1/inboard crown land portion width W4 | 0.70 | 0.70 | 0.50 | 0.60 | 0.80 | 0.92 | 0.70 | 0.70 | 0.70 |
| Outboard crown lateral groove lengths L2/outboard crown land portion width W2 | 0.50 | 0.50 | 0.50 | 0.50 | 0.50 | 0.50 | 0.45 | 0.55 | 0.60 |
| Inboard and outboard shoulder sipes | presence | presence | presence | presence | presence | presence | presence | presence | presence |

TABLE 1-continued

|  | | | | | | | | |
|---|---|---|---|---|---|---|---|---|
| Crown chamfered portion pitches P2/inboard crown lateral groove pitches P1 | 2.0 | 2.0 | 2.0 | 2.0 | 2.0 | 2.0 | 2.0 | 2.0 | 2.0 |
| Steering stability on dry road (score) | 100 | 104 | 105 | 104 | 103 | 102 | 105 | 103 | 102 |
| Snow performance (score) | 100 | 106 | 103 | 104 | 106 | 107 | 105 | 106 | 106 |

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| Tread pattern | FIG. 1 | FIG. 1 | FIG. 1 | FIG. 1 | FIG. 1 | FIG. 1 | FIG. 1 | FIG. 10 |
| Outboard shoulder land portion width W1/outboard crown land portion width W2 | 1.8 | 0.8 | 1 | 2 | 2.2 | 1.8 | 1.8 | 1.8 |
| Inboard crown lateral groove lengths L1/inboard crown land portion width W4 | 0.70 | 0.70 | 0.70 | 0.70 | 0.70 | 0.70 | 0.70 | 0.70 |
| Outboard crown lateral groove lengths L2/outboard crown land portion width W2 | 0.70 | 0.50 | 0.50 | 0.50 | 0.50 | 0.50 | 0.50 | 0.50 |
| Inboard and outboard shoulder sipes | presence | presence | presence | presence | presence | none | presence | presence |
| Crown chamfered portion pitches P2/inboard crown lateral groove pitches P1 | 2.0 | 2.0 | 2.0 | 2.0 | 2.0 | 2.0 | 1.0 | 2.0 |
| Steering stability on dry road (score) | 101 | 101 | 103 | 105 | 105 | 104 | 102 | 103 |
| Snow performance (score) | 107 | 107 | 107 | 105 | 103 | 104 | 104 | 108 |

As a result of the tests, it was confirmed that the example tires according to the disclosure improve steering stability on dry roads and snow performance in a well-balanced manner.

What is claimed is:

1. A tire comprising:
a tread portion having a predetermined orientation for mounting on a vehicle to define an outboard tread edge to be located outwardly of the vehicle and an inboard tread edge to be located inwardly of the vehicle upon being mounted to the vehicle;
the tread portion being provided with one circumferentially extending crown main groove, one circumferentially extending outboard shoulder main groove, and one circumferentially extending inboard shoulder main groove to divide the tread portion into an outboard crown land portion, an inboard crown land portion, an outboard shoulder land portion and an inboard shoulder land portion;
the inboard shoulder land portion being provided with inboard shoulder lateral grooves connecting the inboard tread edge and the inboard shoulder main groove;
the outboard shoulder land portion being provided with outboard shoulder lateral grooves extending axially inwardly from the outboard tread edge and terminating within the outboard shoulder land portion;
the inboard crown land portion being provided with inboard crown lateral grooves extending from the inboard shoulder main groove and terminating within the inboard crown land portion; and
the outboard crown land portion being provided with outboard crown lateral grooves extending from the crown main groove and terminating within the outboard crown land portion, wherein
the outboard crown land portion is provided with semi-opened sipes extending from the crown main groove toward the outboard tread edge and terminating within the outboard crown land portion, and
the semi-opened sipes extend from the outboard crown land portion past a midway point between the crown main groove and the outboard shoulder main groove.

2. The tire according to claim 1, wherein
a ratio W1/W2 of an axial width W1 of the outboard shoulder land portion to an axial width W2 of the outboard crown land portion is in a range of from 1.0 to 2.0.

3. The tire according to claim 1, wherein
each of the inboard crown land portion and the outboard crown land portion comprises a rib region on an outboard tread edge side, and
the rib region extends continuously in a tire circumferential direction without being divided by any lateral grooves having widths equal to or more than 2 mm.

4. The tire according to claim 3, wherein
axial lengths of the semi-opened sipes are greater than axial lengths of the outboard crown lateral grooves.

5. The tire according to claim 1, wherein
the inboard crown land portion is provided with inboard connecting sipes connecting the crown main groove and the inboard crown lateral grooves.

6. The tire according to claim 1, wherein
the outboard crown land portion is provided with outboard connecting sipes connecting the outboard shoulder main groove and the outboard crown lateral grooves.

7. The tire according to claim 6, wherein
axial lengths of the semi-opened sipes are greater than axial lengths of the outboard crown lateral grooves.

8. The tire according to claim 1, wherein
each of the inboard crown land portion and the outboard crown land portion is provided with a circumferentially extending crown longitudinal sipe.

9. The tire according to claim 1, wherein
axial lengths of the outboard crown lateral grooves are smaller than axial lengths of the inboard crown lateral grooves.

10. The tire according to claim 1, wherein
the inboard crown land portion is provided with full-opened sipes traversing completely the inboard crown land portion.

11. The tire according to claim 10, wherein
the inboard crown lateral grooves and the full-opened sipes are arranged alternately in the tire circumferential direction.
12. The tire according to claim 1, wherein
at least one of the outboard shoulder land portion and the inboard shoulder land portion is provided with a circumferentially extending shoulder longitudinal sipe.
13. The tire according to claim 1, wherein
angles $\theta 1$ of the inboard crown lateral grooves to the tire axial direction are in a range of from 10 to 60 degrees.
14. The tire according to claim 1, wherein
angles $\theta 2$ of the outboard crown lateral grooves to the tire axial direction are in a range of from 10 to 60 degrees.
15. The tire according to claim 1, wherein
the inboard crown lateral grooves have axial lengths L1 in a range of from 0.55 to 0.92 times an axial width W4 of the inboard crown land portion.
16. The tire according to claim 1, wherein
the outboard crown lateral grooves have axial lengths L2 in a range of from 0.45 to 0.70 times an axial width W2 of the outboard crown land portion.
17. The tire according to claim 1, wherein
axial lengths of the semi-opened sipes are greater than axial lengths of the outboard crown lateral grooves.
18. The tire according to claim 1, wherein
the semi-opened sipes have axial lengths in a range of 0.70 to 0.85 times an axial width of the outboard crown land portion.
19. A tire comprising:
a tread portion having a predetermined orientation for mounting on a vehicle to define an outboard tread edge to be located outwardly of the vehicle and an inboard tread edge to be located inwardly of the vehicle upon being mounted to the vehicle;
the tread portion being provided with one circumferentially extending crown main groove, one circumferentially extending outboard shoulder main groove, and one circumferentially extending inboard shoulder main groove to divide the tread portion into an outboard crown land portion, an inboard crown land portion, an outboard shoulder land portion and an inboard shoulder land portion;

the inboard shoulder land portion being provided with inboard shoulder lateral grooves connecting the inboard tread edge and the inboard shoulder main groove;

the outboard shoulder land portion being provided with outboard shoulder lateral grooves extending axially inwardly from the outboard tread edge and terminating within the outboard shoulder land portion;

the inboard crown land portion being provided with inboard crown lateral grooves extending from the inboard shoulder main groove and terminating within the inboard crown land portion; and the outboard crown land portion being provided with outboard crown lateral grooves extending from the crown main groove and terminating within the outboard crown land portion, wherein at least one of the inboard and outboard crown land portions is provided with crown chamfered portions each of which is a portion recessed partly of a corner portion between a ground contact surface of the concerned land portion and a sidewall of the concerned land portion, and the crown chamfered portions are arranged at greater pitches in the tire circumferential direction than that of the inboard crown lateral grooves.

20. The tire according to claim 19, wherein
the crown chamfered portions each have an axial width W7 of from 1.0 to 3.0 mm and a depth d10 of from 1.0 to 2.5 mm.

* * * * *